Patented Mar. 27, 1934

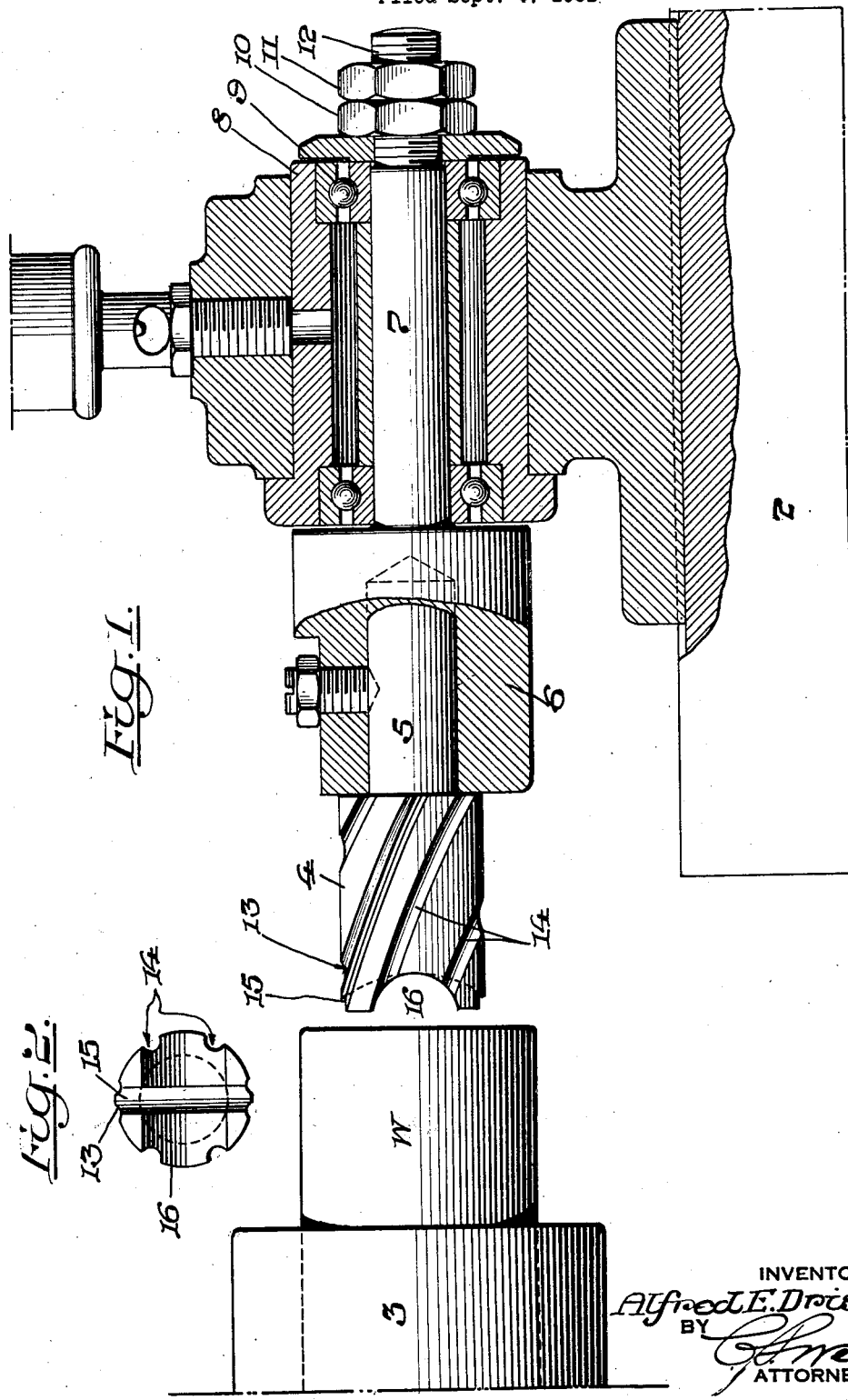

1,952,194

UNITED STATES PATENT OFFICE 1,952,194

BROACHING ATTACHMENT

Alfred E. Drissner, Cleveland, Ohio, assignor to The National Acme Company, Cleveland, Ohio, a corporation of Ohio Application September 3, 1931, Serial No. 560,912

10 Claims. (Cl. 90—33)

This invention relates to broaching attachments for use with metal working machines having a rotatable work spindle and a tool carrier shiftable, one relatively to the other, and while particularly adapted for multiple or single spindle automatic machines, it can be used with any type of machine having the foregoing characteristics, the object of the invention being to provide an improved broaching attachment and method of broaching, simple in construction and operation and highly efficient in use as well as comparatively inexpensive to manufacture and which can be readily used in such machines as multiple and single spindle machines simultaneously with the other tools thereof, thereby saving the necessity of an independent and separate broaching operation on a different machine.

A further object of the invention is the provision of an improved broaching attachment so constructed that it will rotate with the work at the same speed as the work, whereby the necessity of providing independent driving mechanism for operating the broach is avoided.

Heretofore, when it was desired to cut grooves, such as spiral grooves in a piece of work, the broach had to be driven by independent mechanism by utilizing a special grooving or broaching machine, this operation taking place after the regular work was performed on, for instance, a multiple spindle screw machine, and the broach had to be rotated by this driving mechanism in exact coincidence with the spiral cut on the broach. In the present improvement, however, no independent driving mechanism is used and, therefore, no exact coincidence between the driving mechanism and the spiral of the broach is necessary since the broach is rotated by the work at the same speed thereof and thus effectively performs its work without the use of a separate and independent driving mechanism and a separate and independent machine.

In the present instance, only so much of a metal working machine is shown as is necessary to illustrate the present improved broaching attachment.

In the drawing accompanying and forming a part of this specification, Fig. 1 is a partly longitudinal sectional view of this improved broaching attachment mounted on the tool slide of a multiple spindle screw machine and a side view of so much of a work spindle carrier as is necessary to illustrate the present improvement.

Fig. 2 is an end view of the broaching tool.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawing since the invention is capable of other embodiments, and that the phraseology which I employ is for the purpose of description and not of limitation.

The tool slide of the machine is designated by 2 and the hollow work spindle is designated by 3. The broach 4 has its shank 5 clamped in a chuck 6. The chuck has a shank or spindle 7 extending longitudinally of a tool holder 8 mounted and bolted to the tool slide 2. This tool holder is so constructed that it is provided with ball bearings 9 for the broach holder 6. These ball bearings are so constructed that the broach holder will rotate freely in the sliding tool holder 8, it being held therein against longitudinal movement by nuts 10 and 11 mounted on the threaded shank 12 of the spindle 7 and by means of which the end thrust of the broach may be taken up.

The broach or grooving tool can be made with one, two, or as many cutting edges 13 as the shape of the work requires. These cutting edges may be straight or spiral but whatever the form, they run the full length of the broach and thus serve as a guide to the broach which has a bearing the full length thereof and which bearing is thus of the same diameter as the broach and so acts as a pilot to support the work and keep it round, preventing it from getting out of shape when the broaching of the grooves takes place.

The broach is provided with one, two or more grooves 14 as required to provide for oil and chips and the free end of the tool has a radius groove 15, thereby giving the cutting edge a good top rake, and the tool also has a half circle section 16 cut away to provide for chips and oil but the cutting edges are supported by the pilot portion of the broach which enters the hole ahead of the cutting edge and before the tool starts to cut.

By making the broach of hollow or cylindrical form, grooves may be cut on the external face of the work in the same way they are cut on the internal face thereof.

In automatic machines of the kind described herein the work in the form of solid stock bars or tubing usually about 15 feet in length are fed by suitable means through rotatable hollow work spindles 3, usually four carried by an indexible work spindle carrier, from the rear end thereof and after the successive tools perform their work of forming, boring, drilling, etc., during the indexing of the work spindle carrier, the completed piece is cut off so that, in such automatic machines it is not possible for a broach to pass through the work as in ordinary broaching machines as that would require the broach to pass through 15 feet of stock and therefore in this improved machine the broach must be backed off and out of the work without passing through the stock bars. This improved broaching operation takes place before the work is cut off from the stock bars, one piece being completed during each indexing of the carrier.

In the operation of this improved broaching attachment, as illustrated in the present instance, when the main tool slide 2 moves forward by the usual means provided for that purpose, the broach is carried toward the work carried by the work spindle, which work is designated as W in this instance, and as the work is being rotated at a predetermined speed in the usual manner of machines of this kind, as soon as it enters the bore or hole of the work, the broach is rotated at the same speed as the work by the work in the same direction as the work, it being, as hereinbefore stated, so supported by the tool slide that it is free for such rotation. Thus, as the work and broach are rotated together at the same speed as the work and in the same direction, the broach will cut into the work to form either straight or spiral grooves according to the shape of the broach.

In other words, if, for instance, the broach is provided with spiral cutting faces, it will not only rotate with the work but, by reason of the pressure exerted thereon by means of the tool slide and the spiral cutting faces of the broach, forcing it into the work, the broach will turn independently of the the work and thus form a spiral groove or grooves.

The broach is guided into the work just as the thread of a screw is guided into a piece of work by the convolutions of the thread so that, as hereinbefore stated, the broach is not only rotated by the work at the same speed and in the same direction as the work but at the same time, it has a spiral turning movement relative to the work so as to cut the groove, this spiral turning being given by the cutting edge of the broach and if the work is rotated left handed, instead of right handed, the broach, if properly constructed, will cut accordingly.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In an automatic multiple spindle machine, the combination of an indexible hollow rotatable work spindle for the reception and passage therethrough of long stock bars, a sliding tool carrier, and means for automatically cutting a slot in the work previously formed from said stock bars during prior operations at previously indexed positions in the same machine and comprising a broach carried by the sliding tool carrier for rotatable movement independently thereof by the work at the same speed and in the same direction as the work, said broach having cutting edges for cutting a slot in the wall of the work.

2. In an automatic multiple spindle machine, the combination of an indexible hollow rotatable work spindle for the reception and passage therethrough of long stock bars, a sliding tool carrier, and means for automatically cutting a slot in the work previously formed from said stock bars during prior operations at previously indexed positions in the same machine and comprising a broach carried by the sliding tool carrier for rotatable movement independently thereof by the work at the same speed and in the same direction as the work, said broach having spiral cutting edges for cutting a spiral slot in the wall of the work, the pressure on the broach exerted by the sliding tool carrier causing the independent rotation of the tool carrier relative to the work.

3. In an automatic multiple spindle machine, the combination of an indexible hollow rotatable work spindle for the reception and passage therethrough of long stock bars, a sliding tool carrier, and means for automatically cutting a slot in the work previously formed from said stock bars during prior operations at previously indexed positions in the same machine and comprising a broach carried by the sliding tool carrier for rotatable movement independently thereof by the work at the same speed and in the same direction as the work, said broach having spiral cutting edges for cutting a spiral slot in the wall of the work, the pressure on the broach exerted by the sliding tool carrier causing the independent rotation of the tool carrier relative to the work, said cutting edges running the full length of the cutter.

4. In an automatic multiple spindle machine, the combination of an indexible hollow rotatable work spindle for the reception and passage therethrough of long stock bars, a sliding tool carrier, and means for automatically cutting a slot in the work previously formed from said stock bars during prior operations at previously indexed positions in the same machine and comprising a broach carried by the sliding tool carrier for rotatable movement independently thereof by the work at the same speed and in the same direction as the work, said broach having spiral cutting edges for cutting a spiral slot in the wall of the work, the pressure on the broach exerted by the sliding tool carrier causing the independent rotation of the tool carrier relative to the work, said cutting edges running the full length of the cutter with a radius groove at the front end thereof to provide a top rake.

5. In an automatic multiple spindle machine, the combination of an indexible hollow rotatable work spindle for the reception and passage therethrough of long stock bars, a sliding tool carrier, and means for automatically cutting a slot in the work previously formed from said stock bars during prior operations at previously indexed positions in the same machine and comprising a broach carried by the sliding tool carrier for rotatable movement independently thereof by the work at the same speed and in the same direction as the work, said broach having spiral cutting edges for cutting a spiral slot in the wall of the work, the pressure on the broach exerted by the sliding tool carrier causing the independent rotation of the tool carrier relative to the work, said broach having a bearing the full length of the broach and extending beyond said cutting edges thereby to act as a pilot.

6. In an automatic multiple spindle machine, the combination of an indexible hollow rotatable work spindle for the reception and passage therethrough of long stock bars, a sliding tool carrier, and means for automatically cutting a slot in the work previously formed from said stock bars during prior operations at previously indexed positions in the same machine and comprising a broach carried by the sliding tool carrier for rotatable movement independently thereof by the work at the same speed and in the same direction as the work, said broach having spiral cutting edges for cutting a spiral slot in the wall of the work, the pressure on the broach exerted by the sliding tool carrier causing the independent rotation of the tool carrier relative to the work, said broach having a bearing with a circular section removed at its forward end to allow for oil and chips.

7. In an automatic multiple spindle machine, the combination of an indexible hollow rotatable work spindle for the reception and passage therethrough of long stock bars, a sliding tool carrier, and means for automatically cutting a slot in the work previously formed from said stock bars during prior operations at previously indexed positions in the same machine and comprising a broach carried by the sliding tool carrier for rotatable movement independently thereof by the work at the same speed and in the same direction as the work, said broach having spiral cutting edges for cutting a spiral slot in the wall of the work, the pressure on the broach exerted by the sliding tool carrier causing the independent rotation of the tool carrier relative to the work, said broach having a bearing having oil and chip grooves therein running the full length of said bearing.

8. In an automatic multiple spindle machine, the combination of an indexible hollow rotatable work spindle for the reception and passage therethrough of long stock bars, a sliding tool carrier, and means for automatically cutting a slot in the work previously formed from said stock bars during prior operations at previously indexed positions in the same machine and comprising a broach carried by the sliding tool carrier for rotatable movement independently thereof by the work at the same speed and in the same direction as the work, said broach having spiral cutting edges for cutting a spiral slot in the wall of the work, the pressure on the broach exerted by the sliding tool carrier causing the independent rotation of the tool carrier relative to the work, said cutting edges running the full length of the cutter with a radius groove at the front end thereof to provide top rake, the broach having a bearing extending the entire length thereof and beyond said cutting edges, said bearing having at its front end a circular section removed and also having oil and chip grooves running the length thereof.

9. The method of cutting a slot in the wall of a piece of work, formed at a preceding indexed position of the work, which consists in rotating the work and forcing a freely rotatable broach having protruding cutting edges into the work simultaneously with the rotation of said work, the work rotating the broach at the same speed and in the same direction as the work and during such rotation exerting endwise pressure on the broach.

10. The method of cutting a slot in the wall of a piece of work formed at a preceding indexed position of the work which consists in rotating the work and forcing a freely rotatable broach having spiral protruding cutting edges into the work simultaneously with the rotation of said work, the work rotating the broach at the same speed and in the same direction as the work and during such rotation exerting endwise pressure on the broach thereby to rotate it independently of the work to broach a spiral slot.

ALFRED E. DRISSNER.